US009142102B2

(12) United States Patent
Trossbach, Jr. et al.

(10) Patent No.: US 9,142,102 B2
(45) Date of Patent: Sep. 22, 2015

(54) METHOD AND APPARATUS FOR VISUALIZING NETWORK SECURITY ALERTS

(71) Applicant: ICF International, Baltimore, MD (US)

(72) Inventors: Lee C. Trossbach, Jr., Hanover, MD (US); Robinson E. Pino, Potomac, MD (US)

(73) Assignee: ICF INTERNATIONAL, Baltimore, MD (US)

( * ) Notice: Subject to any disclaimer, the term of this patent is extended or adjusted under 35 U.S.C. 154(b) by 135 days.

(21) Appl. No.: 13/933,885

(22) Filed: Jul. 2, 2013

(65) Prior Publication Data

US 2015/0009038 A1 Jan. 8, 2015

(51) Int. Cl.
*G08B 3/00* (2006.01)
*G08B 5/22* (2006.01)

(52) U.S. Cl.
CPC ........................................ *G08B 5/22* (2013.01)

(58) Field of Classification Search
CPC ....................................................... G08B 5/22
USPC ................... 340/506, 507, 539.1, 539.11, 3.1
See application file for complete search history.

(56) References Cited

U.S. PATENT DOCUMENTS 5,400,246 A * 3/1995 Wilson et al. .................. 700/17

OTHER PUBLICATIONS

Spherical coordinate system, From Wikipedia, the free encyclopedia, http://en.wikipedia.org/wiki/Spherical_coordinate_system.

* cited by examiner

*Primary Examiner* — Daryl Pope
(74) *Attorney, Agent, or Firm* — Squire Patton Boggs (US) LLP

(57) ABSTRACT

A method and apparatus can be configured to perform the steps of displaying, on a display, a first visual representation of volume in three-dimensional space. The method can also display, on the display, a visual representation of a network security alert. The network security alert can correspond to a notification of a network attack, a network intrusion, or an unwanted activity. The representation of the network security alert can be positioned within the first visual representation of volume. The position of the representation of the network security alert within the first visual representation of volume reflects at least one characteristic of the network security alert.

18 Claims, 13 Drawing Sheets

Universe: Commercial IDS 1
Universe: Commercial IDS 2
Universe: Open Source IPS 1
Universe: In-House Behavior Tool 1
Universe: In-House Anomaly Tool 1
Universe: etc....
Universe: Snort
- Galaxy: SQL Injection
  - Solar System: Buffer Overflow
    - Planet: SQL/SMB v1
    - Planet: SQL/SMB v2
    - Planet: SQL/SMB v3
    - Planet: SQLplus sid v1
    - Planet: SQLplus sid v2
    - Planet: SQLplus sid v3
  - Solar System: Command Shell
    - Planet: Generic Shellcode v1
    - Planet: Generic Shellcode v2
    - Planet: Sense Post Shell v1
  - Solar System: Command Injection
    - Planet: Pangolin v1
    - Planet: Pangolin v2
    - Planet: Pangolin v3
    - Planet: Create Table v1
    - Planet: Create Table v2
- Galaxy: XSS
  - Solar System: Search Query XSS
    - Planet: Weblogic Server v1
    - Planet: Weblogic Server v2
  - Solar System: Sharepoint XSS
    - Planet: Sharepoint Default v1
    - Planet: Sharepoint Server Help v1
    - Planet: Sharepoint Form mail v1
- Galaxy: Unauthorized URL Paths
  - Solar System: Directory Change
    - Planet: Directory Traversal v1
    - Planet: Directory Traversal v2
  - Solar System: Privileged Directories and Commands
    - Planet: /bin/python v1
    - Planet: /etc/shadow v1
    - Planet: /bin/ls v1
    - Planet: /etc/motd v1

Fig. 9

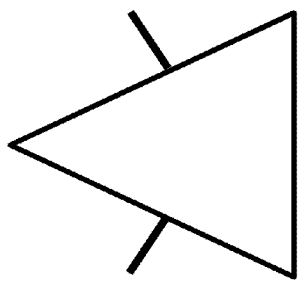
1 alert
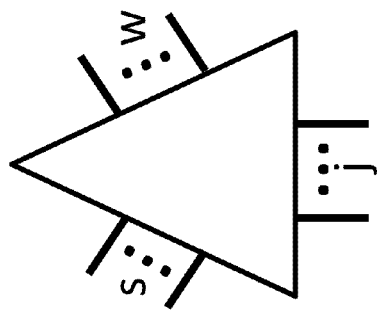
4 alert
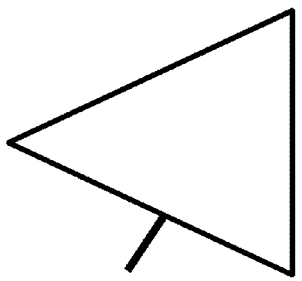
2 alerts
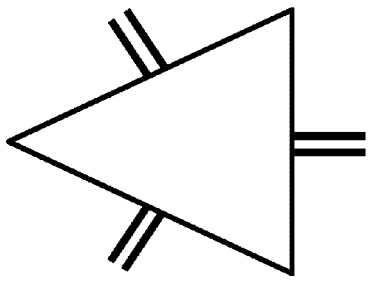
7 alerts
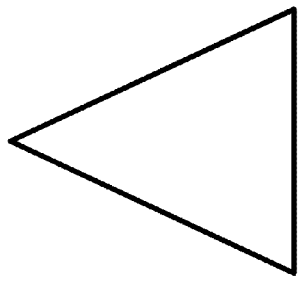
3 alerts
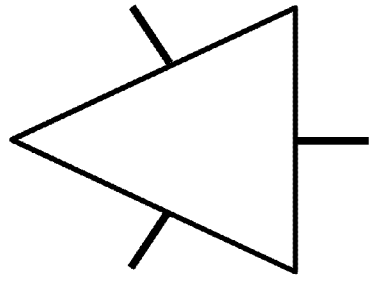
(1+s+w+j) alerts
Fig. 10

METHOD AND APPARATUS FOR VISUALIZING NETWORK SECURITY ALERTS

GOVERNMENT LICENSE RIGHTS

This invention was made with government support under W911QX-12-F-0052 awarded by the U.S. Army Research Laboratory. The government has certain rights in the invention.

BACKGROUND

1. Field

Embodiments of the invention are directed to a network security system that visually displays network security alerts.

2. Description of the Related Art

Network security systems rely on the ability to screen and monitor network traffic in order to identify unauthorized or malicious activity that may be considered harmful. In particular, network security systems seek to identify unwanted system usage while the usage is occurring or is about to occur so that appropriate action may be taken in response to the usage. The system can include computers, networks, or any combination thereof. In addition to identifying unwanted system usage, network security systems may record information about the unwanted system usage, attempt to prevent/stop the unwanted system usage, and/or report the unwanted system usage to appropriate personnel.

SUMMARY

According to a first embodiment, a method can include displaying, on a display, a first visual representation of volume in three-dimensional space. The method can also include displaying, on the display, a visual representation of a network security alert. The network security alert can correspond to a notification of a network attack, a network intrusion, or an unwanted activity. The representation of the network security alert can be positioned within the first visual representation of volume. The position of the representation of the network security alert within the first visual representation of volume can reflect at least one characteristic of the network security alert.

In the method of the first embodiment, the method can also include displaying, on the display, a second visual representation of volume in three-dimensional space. The first visual representation of volume can be positioned within the second visual representation of volume. The first visual representation of volume can be positioned within the second visual representation of volume in accordance with a first logical coordinate system.

In the method of the first embodiment, the method can also include displaying, on the display, a third visual representation of volume in three-dimensional space. The second visual representation of volume can be positioned within the third visual representation of volume. The second visual representation of volume can be positioned within the third visual representation of volume in accordance with a second logical coordinate system.

In the method of the first embodiment, the representation of the network security alert can be positioned within the first visual representation of volume according to at least one of a source internet address, a source port, a destination internet address, a destination port, a protocol, an alert identification number, and any other common field corresponding to the network security alert.

In the method of the first embodiment, the second representation of volume can correspond to a category such as one of a peer-to-peer category, a Trojan category, a chat client category, and a structured-query-language injection category.

In the method of the first embodiment, the first visual representation of volume can correspond to a representation of a solar system, the second visual representation of volume can correspond to a representation of a galaxy, and the third visual representation of volume can correspond to a representation of a universe.

According to a second embodiment, an apparatus can include at least one processor. The apparatus can also include at least one memory including computer program code. The at least one memory and the computer program code can be configured, with the at least one processor, to cause the apparatus at least to display, on a display, a first visual representation of volume in three-dimensional space. The apparatus can also display, on the display, a visual representation of a network security alert. The network security alert can correspond to a notification of a network attack, a network intrusion, or an unwanted activity. The representation of the network security alert can be positioned within the first visual representation of volume, and the position of the representation of the network security alert within the first visual representation of volume can reflect at least one characteristic of the network security alert.

In the apparatus of the second embodiment, the apparatus can also be caused to display, on the display, a second visual representation of volume in three-dimensional space. The first visual representation of volume can be positioned within the second visual representation of volume. The first visual representation of volume can be positioned within the second visual representation of volume in accordance with a first logical coordinate system.

In the apparatus of the second embodiment, the apparatus can also be caused to display, on the display, a third visual representation of volume in three-dimensional space. The second visual representation of volume can be positioned within the third visual representation of volume. The second visual representation of volume can be positioned within the third visual representation of volume in accordance with a second logical coordinate system.

In the apparatus of the second embodiment, the representation of the network security alert can be positioned within the first visual representation of volume according to at least one of a source internet address, a source port, a destination internet address, a destination port, a protocol, an alert identification number, and any other common field corresponding to the network security alert.

In the apparatus of the second embodiment, the second representation of volume can correspond to a category such as one of a peer-to-peer category, a Trojan category, a chat client category, and a structured-query-language injection category.

In the apparatus of the second embodiment, the first visual representation of volume can correspond to a representation of a solar system, the second visual representation of volume can correspond to a representation of a galaxy, and the third visual representation of volume can correspond to a representation of a universe.

According to a third embodiment, a computer program can be embodied on a non-transitory computer readable medium. The computer program can be configured to control a processor to perform a process. The process can include displaying, on a display, a first visual representation of volume in three-dimensional space. The process can also include displaying, on the display, a visual representation of a network security alert. The network security alert can correspond to a notification of a network attack, a network intrusion, or an unwanted activity, the representation of the network security alert can be positioned within the first visual representation of volume. The position of the representation of the network security alert within the first visual representation of volume can reflect at least one characteristic of the network security alert.

In the computer program of the third embodiment, the process can further include displaying, on the display, a second visual representation of volume in three-dimensional space. The first visual representation of volume can be positioned within the second visual representation of volume. The first visual representation of volume can be positioned within the second visual representation of volume in accordance with a first logical coordinate system.

In the computer program of the third embodiment, the process can further include displaying, on the display, a third visual representation of volume in three-dimensional space. The second visual representation of volume can be positioned within the third visual representation of volume. The second visual representation of volume can be positioned within the third visual representation of volume in accordance with a second logical coordinate system.

In the computer program of the third embodiment, the representation of the network security alert can be positioned within the first visual representation of volume according to at least one of a source internet address, a source port, a destination internet address, a destination port, a protocol, an alert identification number, and any other common field corresponding to the network security alert.

In the computer program of the third embodiment, the second representation of volume can correspond to a category such as one of a peer-to-peer category, a Trojan category, a chat client category, and a structured-query-language injection category.

In the computer program of the third embodiment, the first visual representation of volume can correspond to a representation of a solar system. The second visual representation of volume can correspond to a representation of a galaxy. The third visual representation of volume can correspond to a representation of a universe.

BRIEF DESCRIPTION OF THE DRAWINGS

For proper understanding of the invention, reference should be made to the accompanying drawings, wherein:

FIG. 9 illustrates examples of universes, galaxies, and solar systems, in accordance with one embodiment.

FIG. 10 illustrates graphical representations of alerts of a similar kind in accordance with one embodiment.

DETAILED DESCRIPTION

Figure 1:
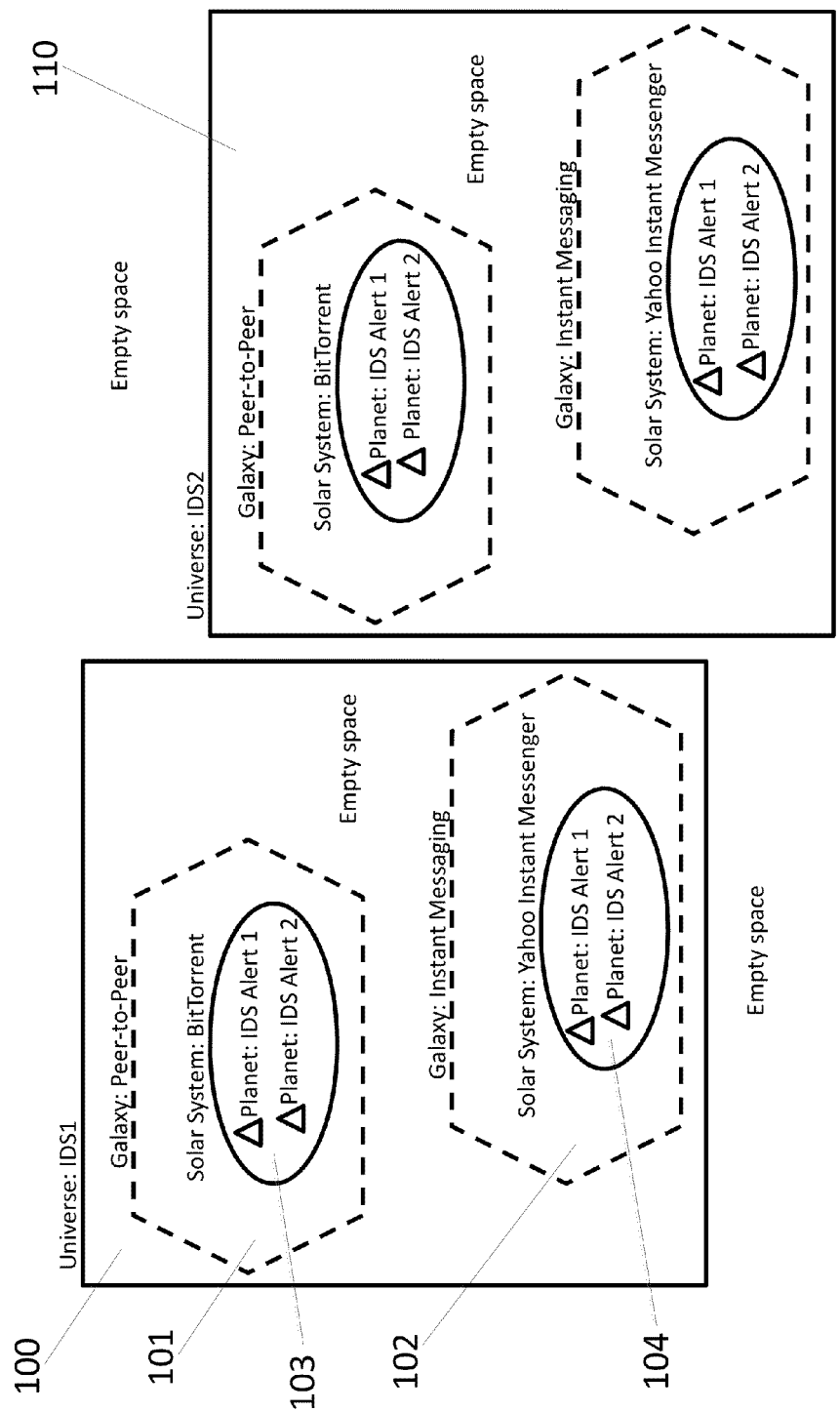
FIG. 1 illustrates a system for visualizing alerts in accordance with one embodiment.

One embodiment of the present invention is directed to a network security system that visually displays network security alerts. The method can visualize network security alerts by visualizing universes, galaxies, solar systems, and/or planets, as described in more detail below. Visualizing network security alerts, universes, galaxies, and/or solar systems can generally be considered as displaying a visual representation of the network security alerts, universes, galaxies, and/or solar systems. An alert is generally considered to be a notification that an attack, an intrusion, or an unwanted activity will occur, has occurred, or may possibly occur. An intrusion can generally be considered as access to or execution on a computer system by a malicious or unauthorized user. Unwanted activity can generally be considered as any activity that could place the network at risk, such as the usage of unauthorized software on a computer, or an occurrence of a policy violation.

When using previous approaches of network security systems for purposes of providing computer network defense, an analyst generally monitors different network security systems (such as single or multiple intrusion detection or intrusion prevention tools) for confirmed attacks, compromises, and policy violations. When using the previous approaches, it is generally difficult for analysts to ascertain patterns of network security activity (such as intrusion activity, for example) when examining the outputted/reported data provided by the utilized network security systems.

Analysts generally want to ascertain patterns of network security activity when examining the outputted/reported data because the analysts may want to have a concise understanding of any specific network security activity (such as intrusion activity) that is occurring within a particular network area. With a concise understanding of the specific network security events that are happening, the analyst can more clearly determine where he or she should focus the analytic efforts.

By ascertaining patterns of network security events, the analyst can also better understand where data is going, what parts of the network are being attacked, and how the attacks are occurring. The analyst may then be more ready to defend the network from the next attack, the next compromise, and/or the next vulnerability.

The task of ascertaining patterns of intrusion activity/events has been increasingly difficult because analysts are given increasingly more and more data (from an ever larger number of alerting tools and interfaces) to analyze.

One embodiment of the present invention provides a three-dimensional visualization approach for visualizing network security alerts. This three-dimensional visualization approach can act as a visual aid for an analyst so that the analyst can more effectively and more quickly determine a state of a monitored network. The analyst can more quickly see the network security events within the network, and can more quickly ascertain any patterns that exist within the network security events. By using an embodiment of the present invention, the analyst can monitor the network both in realtime and from a long-term historical perspective.

When providing visualizations of the network security alerts, one embodiment of the present invention maps network security alerts according to characteristics which analysts are familiar with. Mapping can be generally considered as the positioning of the visualized alert at a particular location in a 3D space. The 3D space can be a represented/simulated 3D space. As described in more detail below, a visualized alert can be positioned at a particular location based on characteristics of the alert which analysts typically use to characterize the alert. One embodiment of the present invention is directed to a 3D visualization methodology that enhances the utility of new and current analytical tools/techniques.

FIG. 1 illustrates a system for visualizing alerts in accordance with one embodiment. The system can be a three-dimensional (3D) visualization paradigm that is analogous to the physical universe. For example, as humans can view and name constellations according to perceived celestial patterns in outer-space, analysts can ascertain patterns in network security alerts as the analysts view the mapped alerts in the 3D visualization. When naming constellations in outer-space, humans can reference celestial bodies such as a Butterfly Nebula, and a Rose Nebula, for example. By mapping generated alerts to a 3D interface according to characteristics that are already familiar to analysts, one embodiment of the present invention can create visualizations of alerts that are more intuitive to the analysts. Intuitive visualizations can help and enhance an analyst's performance in several areas. The analyst's performance can be improved by allowing the analyst to achieve faster detection rates, by allowing the analyst to gain a deeper and richer understanding of the data, by allowing the analyst to more readily detect anomalies with greater efficiency, and by allowing the analyst to be able to discover new relationships between network attackers, targets, and threats.

During operation, alerts can be visualized and positioned in accordance to certain relationships determined by an analyst and intrusion detection system (IDS) tools. The alerts can be visualized and positioned within an intuitive interface. The mapping of relationships into the intuitive interface allows a location of a given alert to impart immediate meaning to the analyst as to the characteristics of the given alert. The visual information can also enable the analyst to quickly infer real-time meaning and correlations for faster incident response. As illustrated in FIG. 1, the 3D visualization system can present alerts according a framework that is analogous to the physical universe.

Referring again to FIG. 1, one embodiment can use a system that includes representations of universes, galaxies, solar systems, planets, and empty space, for example. A universe can be a representation of 3D space. A galaxy can be a representation of 3D space that is a subset within the 3D space of a universe. A solar system can be a representation of 3D space that is a subset within the 3D space of a galaxy. A planet may be a representation of a location within the 3D space of a solar system. Although the above example lists four different representations (universes, galaxies, solar systems, and planets), with each representation corresponding to portions of the 3D space at different levels of specificity, other embodiments can use less or more than four representations. Further, other embodiments can designate the representations using labels different than "universe," "galaxy," "solar system," and "planet." As described in more detail below, an analyst can use the representations to assign common and meaningful descriptions to network security events. One embodiment will enable an analyst to efficiently monitor and respond to network security events.

As illustrated in FIG. 1, one embodiment includes at least two universes (Universe IDS1 100 and Universe IDS2 110). In the example of FIG. 1, one embodiment can include two galaxies within each universe. Referring to Universe IDS1 100, this universe includes two galaxies (101, 102). The galaxies (101, 102) of universe 100 can correspond to services such as "peer-to-peer" services and "instant messaging" services, respectively, for example. The "peer-to-peer" galaxy 101 can include a solar system corresponding to "BitTorrent™" solar system 103, for example. The "instant messaging" galaxy 102 can include a solar system corresponding to "Yahoo Instant Messenger™" solar system 104, for example. The solar systems can include planets which can correspond to specific network security alerts (such as IDS alerts, for example), as identified by triangles in FIG. 1.

In view of the above, suppose IDS activity occurs as a result of improper or authorized use of "Yahoo Instant Messenger™." In this scenario, a visualized network security alert can be positioned at a planet location of "IDS Alert 1," within solar system "Yahoo Instant Messenger™" 104, within galaxy "Instant Messaging" 102, and within "Universe IDS1" 100. As such, when an analyst sees a visualized network security alert, in a specific universe, in a specific galaxy, in a specific solar system, and at a specific planet, the analyst can quickly ascertain characteristics of the intrusion that triggered the visualized network security alert.

The represented universes, galaxies, solar systems, and planets can also correspond to logical categories that are logically related. For example, galaxy 101 can correspond to a category of "Peer-to-Peer" services. Each solar system within galaxy 101 can then correspond to a specific "Peer-to-Peer" service (such as BitTorrent™). Next, each planet within solar system 103 can correspond to a specific alert relating to BitTorrent™.

Figure 2:
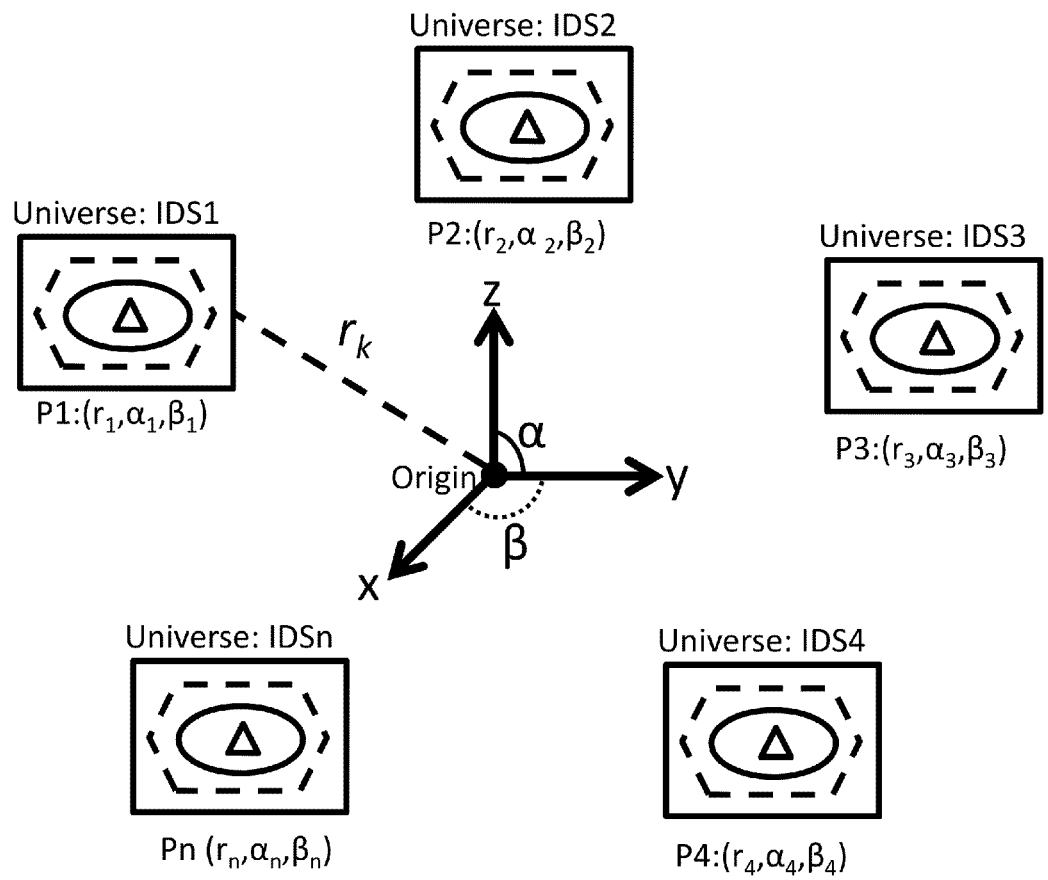
FIG. 2 illustrates a coordinate system for positioning visualized alerts in accordance with one embodiment.

FIG. 2 illustrates a coordinate system for positioning visualized alerts in accordance with one embodiment. As shown in FIG. 2, the universes can be positioned in accordance with a coordinate system, such as a spherical coordinate system, for example. Although the example of FIG. 2 illustrates a spherical coordinate system, other embodiments can use any other coordinate system for positioning purposes. Other coordinate systems include, but are not limited to, the Cartesian coordinate system, the polar coordinate system, the cylindrical coordinate system, the homogeneous coordinate system, for example. With the spherical coordinate system shown in FIG. 2, $r_k$ can be the radial distance, $\alpha$ can be the polar angle, and $\beta$ can be the azimuth angle.

In one embodiment, no two universes occupy the same representative space. Therefore, the specific placement of each universe within the 3D visualization can be important and can follow predetermined rules. The designated amount of representative space for each universe can be specified in arbitrary units that will allow for easy scaling given a specific computer monitor to render the information graphically. In one embodiment, a universe can be represented by a cubic volume with dimensions of an equal width "a," length "a," and height "a." As such, the volume of the cube can correspond to $a \times a \times a = a^3$. Although this embodiment represents each universe as a cubic volume, other embodiments can use other types of representative volumes, with other dimensions.

Figure 3:
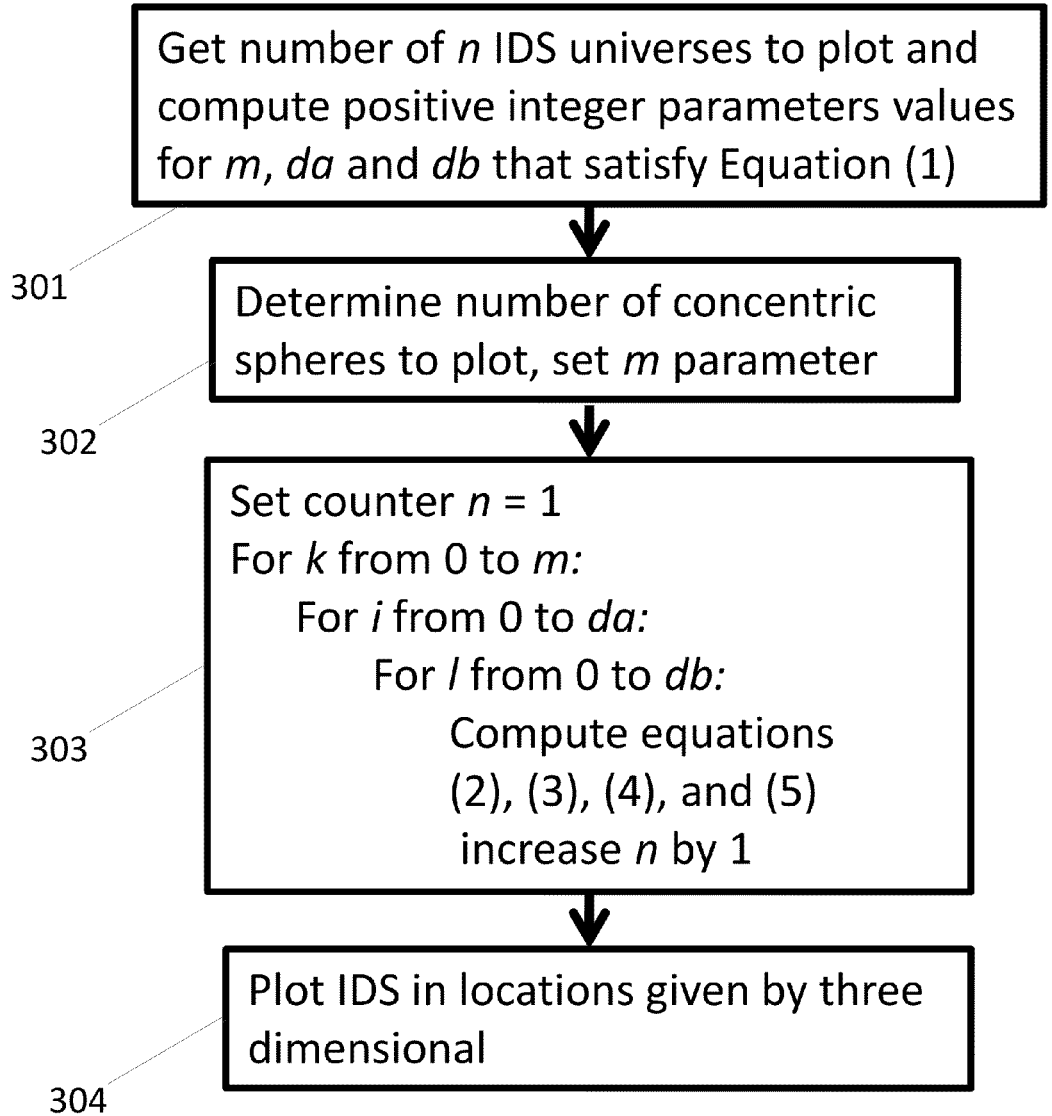
FIG. 3 illustrates a flow diagram of a method for visualizing and positioning alerts in accordance with one embodiment.

FIG. 3 illustrates a flow diagram of a method for visualizing and positioning alerts in accordance with one embodiment. In one embodiment, a distance of separation between one universe and another universe can be "a," so as to not overlap two universes. In this example, the method of FIG. 3 places/positions universes using a spherical framework, along the outer edge of a generated sphere, as described in more detail below. Although this example places/positions universes according to a spherical framework, any type of logical framework can be used to place universes so that they do not overlap with one another.

Using the spherical framework for placing universes, placement of a given number of "n" universes, filling a volume of size dimensions of width "w," length "l," and height "h," can be determined in accordance with the method illustrated by FIG. 3. At 301, given "n" number of universes to place, one embodiment computes parameters "m," "da," and "db," using Equation (1) below. At 302, parameter "m" can correspond to the number of concentric generated spheres to plot, "da" can correspond to the number of partitions (used to place the universes) in the polar angle direction, and "db" can correspond to the number of partitions (used to place the universes) in the azimuth angle direction, using a spherical coordinate system.

$$n = m \times da \times db \quad (1)$$

The radius of each sphere is computed using Equation (2), where k is a positive integer value between 1 and m. The position for each universe in the volume is given by equations (2), (3), (4), and (5), where n is the nth universe location, "i" is a positive integer value between 0 and (da minus 1), and l is a positive integer value between 0 and (db minus 1), respectively.

$$r_k = 2ka \quad (2)$$

$$x[n] = r_k \times \sin\left((i + 0.5) \times \frac{\pi}{da}\right) \times \cos\left(l \times \frac{2 \times \pi}{db}\right) \quad (3)$$

$$y[n] = r_k \times \sin\left((i + 0.5) \times \frac{\pi}{da}\right) \times \sin\left(l \times \frac{2 \times \pi}{db}\right) \quad (4)$$

$$z[n] = r_k \times \cos\left((i + 0.5) \times \frac{\pi}{da}\right) \quad (5)$$

Therefore, at 303, for each of the universes to plot (with "n" total universes to plot), each universe is plotted within its own partition in both the polar angle direction and the azimuth angle direction. At 304, depending on the value of "m," the universes will be plotted along the outer edges of "m" generated spheres, as described in more detail below.

Figure 4:
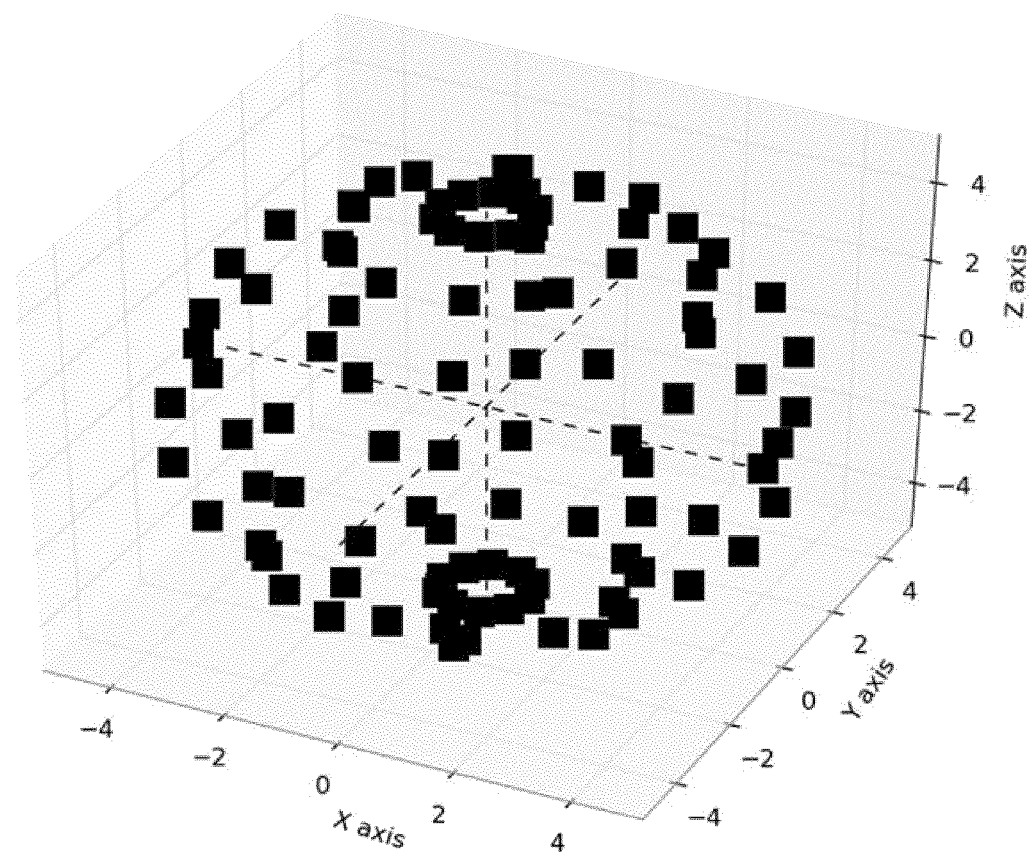
FIG. 4 illustrates visualized universes in accordance with one embodiment.

FIG. 4 illustrates visualized universes in accordance with one embodiment. In the example of FIG. 4, each universe is represented by a cubic volume. However, as described above, other embodiments can use any type of volume to represent each universe. In the example of FIG. 4, each universe is placed/plotted in its own partition in both the polar angle direction and the azimuth angle direction, along the other edge of a generated sphere (of a spherical framework). However, as described above, other embodiments can use any logical framework to place/position the universes. In the example of FIG. 4, one concentric generated sphere is used to place/position the universes. However, as described above, more than one concentric generated sphere can be used to place/position the universes. In view of the above description of the example shown in FIG. 4, FIG. 4 shows a plot of 100 universes where m=1, da=10, and db=10.

Figure 5:
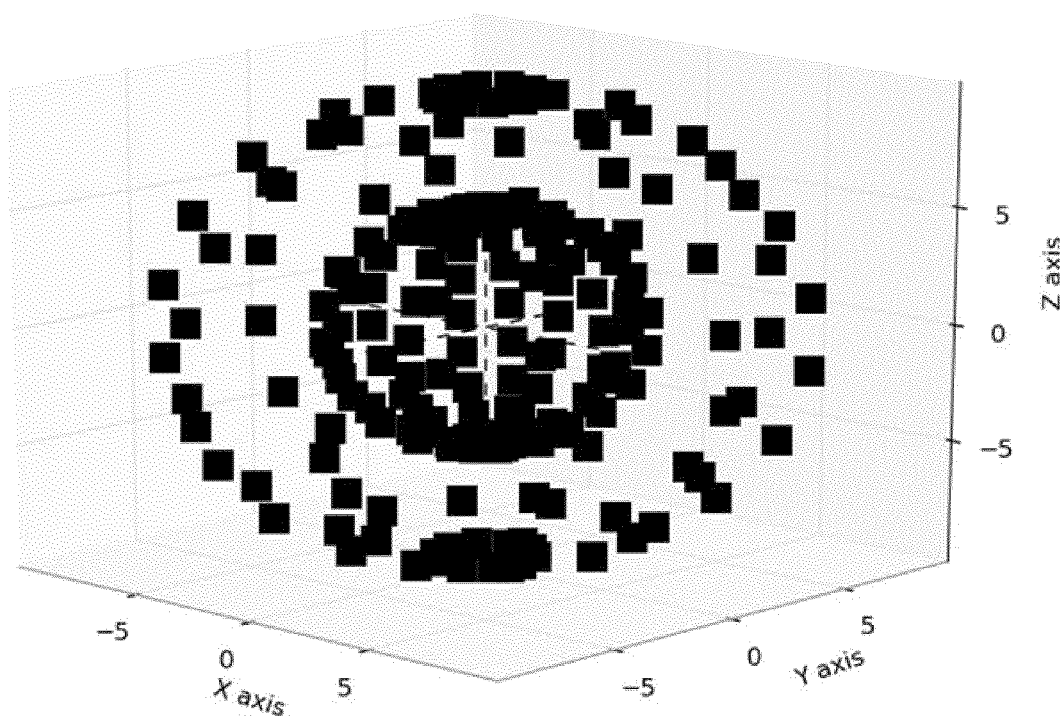
FIG. 5 illustrates visualized universes in accordance with another embodiment.

FIG. 5 illustrates visualized universes in accordance with another embodiment. Similar to the example shown in FIG. 4, the example shown in FIG. 5 also represents each universe using a cubic volume, and also uses a spherical framework to position/plot each of the visualized universes. However, in contrast to the example of FIG. 4, FIG. 5 shows a plot of 200 universes where m=2, da=10, and db=10. Therefore, the example of FIG. 5 places/plots twice as many universes, along the outer edges of two generated spheres.

Figure 6:
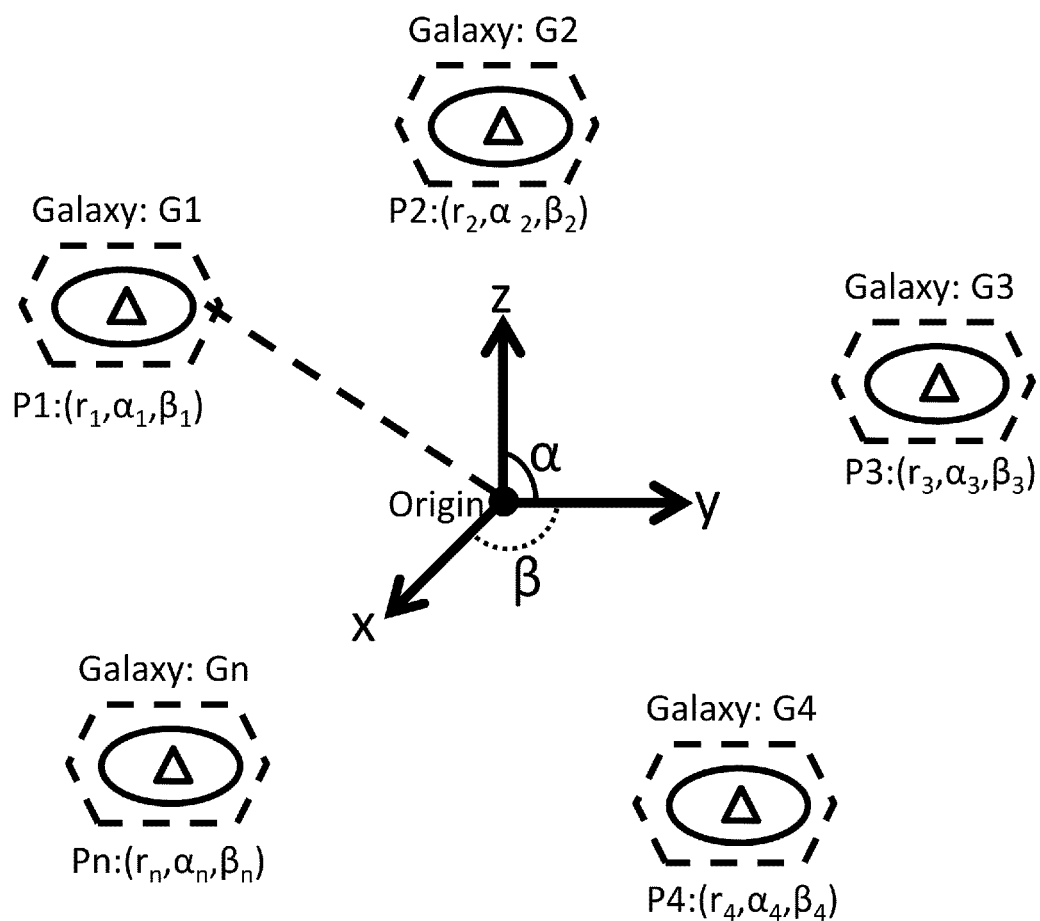
FIG. 6 illustrates a coordinate system for positioning visualized galaxies within a universe in accordance with one embodiment.

FIG. 6 illustrates a coordinate system for positioning visualized galaxies within a universe in accordance with one embodiment. As described above, each universe can be represented as a volume that is logically positioned/plotted within empty space. In one embodiment, each galaxy can be represented as a volume that is logically positioned/plotted within the volume of a universe. As such, the volume of each galaxy can be a subset within the volume of a universe. As such, galaxies can be visualized and positioned/plotted within each universe using methods similar to the methods of placing the universes in empty space.

In one embodiment, the galaxies can correspond to broad categories of network services or network threats such as a Peer-to-Peer (P2P) Galaxy, a Trojan Galaxy, a Chat Client Galaxy, and/or a structured query language (SQL) Injection Galaxy, as described in more detail below. In general, users can define the categories that correspond to each universe, galaxy, solar system, and planet.

Figure 7:
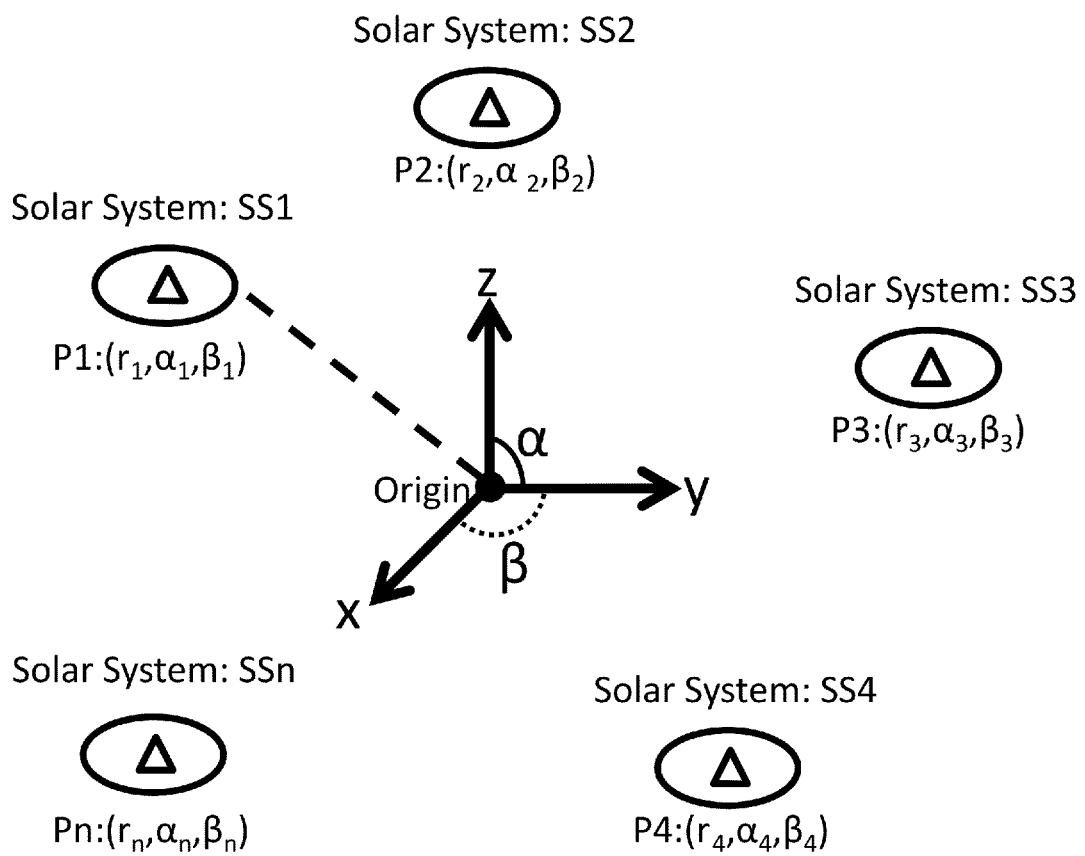
FIG. 7 illustrates a coordinate system for positioning visualized solar systems within a galaxy in accordance with one embodiment.

FIG. 7 illustrates a coordinate system for positioning visualized solar systems within a galaxy in accordance with one embodiment. As described above, each universe can be represented as a volume that is logically positioned/plotted within empty space, and each galaxy can be represented as a volume that is logically positioned/plotted within a universe. In one embodiment, each solar system can be represented as a volume that is logically positioned/plotted within the volume of a galaxy. As such, the volume of each solar system can be a subset within the volume of a galaxy. As such, solar systems can be visualized and positioned/plotted within each galaxy using methods similar to the methods of placing the universes in empty space, and similar to the methods of placing the galaxies in a universe.

The solar systems shown in FIG. 7 can each correspond to a subdivision of a network security detection classification (family/genre) represented by one galaxy (instant messaging, BitTorrent™, file-transfer protocol (FTP), for example).

Figure 8:
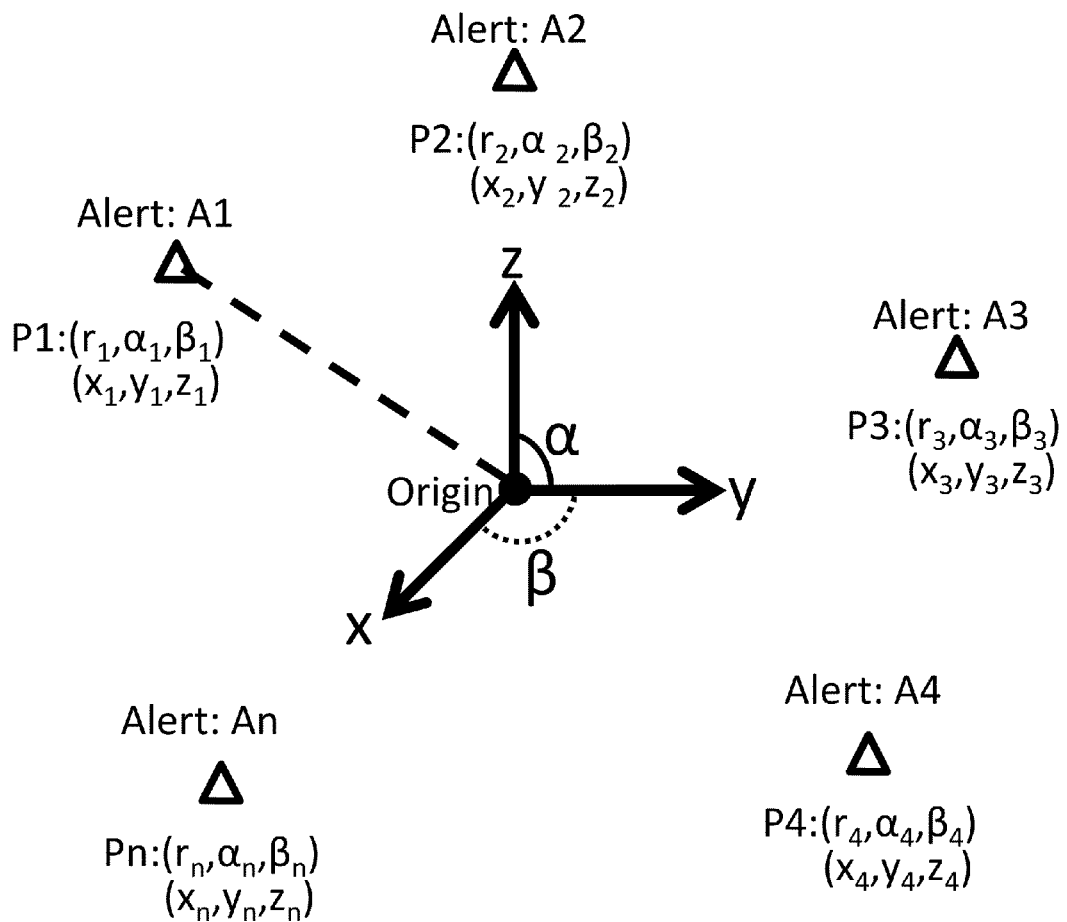
FIG. 8 illustrates a coordinate system for positioning visualized alerts within a solar system in accordance with one embodiment.

FIG. 8 illustrates a coordinate system for positioning visualized alerts within a solar system in accordance with one embodiment. In one embodiment, the planets (with each planet corresponding to a discrete network security alert) can be positioned within solar systems using methods similar to the methods of placing the universes and galaxies. However, in other embodiments, the positioning of the planets (alerts) within each solar system can be determined based upon the characteristics of each alert, as described in more detail below. Each visualized planet can correspond to a representative volume or simply a representative point/location.

As described above, each visualized alert (each planet) can be positioned within the volume of a solar system in accordance to a logical coordinate system (such as a spherical coordinate system or a Cartesian coordinate system, for example). Regardless of the specific coordinate system being used, the location/coordinate of an alert can reflect the characteristics of the alert. For example, if a Cartesian coordinate system is used, the position of a placed alert along the x-axis can correspond to a destination port number of the placed alert, the position of the placed alert along the y-axis can correspond to a source internet address of the placed alert, and the position of the placed alert along the z-axis can correspond to a destination internet address of the placed alert, for example. In one embodiment, any number of other information fields given in the network traffic packets can be used to plot specific planetary alerts.

FIG. 9 illustrates examples of universes, galaxies, and solar systems, in accordance with one embodiment. Universes can correspond to different classifications that threats can belong to. Universes can also correspond to different tools that are used for IDS. For example, each universe can correspond to a signature-based tool, a behavioral tool, a statistical anomaly tool, a tool which monitors commercial network activity, a tool which monitors open-source network activity, a tool which monitors in-house behavior, a tool which monitors in-house anomalies, and/or a SNORT™ tool, for example. Each galaxy can correspond to an Structured Query Language (SQL) injection activity, a cross-site scripting (XSS) activity, unauthorized uniform resource locator (URL) path activity, instant messaging activity, hacking-tool download activity, vulnerability tool activity, reverse-shell activity, internet relay chat (IRC) bot activity, rootkit activity, activity involving Trojans, activity involving Rogue Antivirus, activity involving misconfigured printers, activity involving peer-to-peer networks, activity involving anonymizers, activity involving video game protocols, activity involving simple mail transfer protocol (SMTP) misconfigurations, and activity involving domain name system (DNS) misconfigurations, for example. The approach is flexible such that a galaxy can be defined to correspond with any activity or intrusion type that the network security analyst is interested in tracking. This can allow for future configurations to account for new intrusion vectors that do not yet exist. In certain embodiments, a solar system can represent a buffer overflow or a command-shell vulnerability, and each planet can represent a specific attack vector such as a generic shellcode or a directory traversal, displayed in more detail FIG. 9.

FIG. 10 illustrates graphical representations of alerts of a similar kind in accordance with one embodiment. Network security alerts of a similar kind (for example, alerts corresponding to a same IDS rule, alerts that are triggered by a given event, for example) can be grouped together following a graphical representation. As illustrated in FIG. 10, a shape can be used to represent an occurrence of a single network security alert. For example, as shown in FIG. 10, each triangular shape can represent an occurrence of a single network security alert. In one embodiment, a triangle followed by a single spike can represent an occurrence of two alerts of the same kind, and a triangle with two, three, up to p number of spikes will represent occurrences of three, four, and p+1 number of alerts.

By using the graphical representation of FIG. 10 for similar network security alerts, one embodiment can reduce a number of alert points in a given visualization volume, while alerts that have occurred more can have more spikes than alerts that have occurred less. Therefore, the analyst can more readily recognize the type and frequency of intrusion activity.

As described above, embodiments of the present invention are directed to a method and apparatus for the visualization of network security alerts that use the physical universe as a point of reference. In one embodiment, the universe is used to represent IDS tools, galaxies are used to represent types of network connections, solar systems are used to represent sub-classes of network connections, and planets are used to represent network security alerts triggered by preprogrammed rule violations. One embodiment provides a methodology that can enhance the visualization capacity of an analyst performing network security and monitoring tasks.

Figure 11:
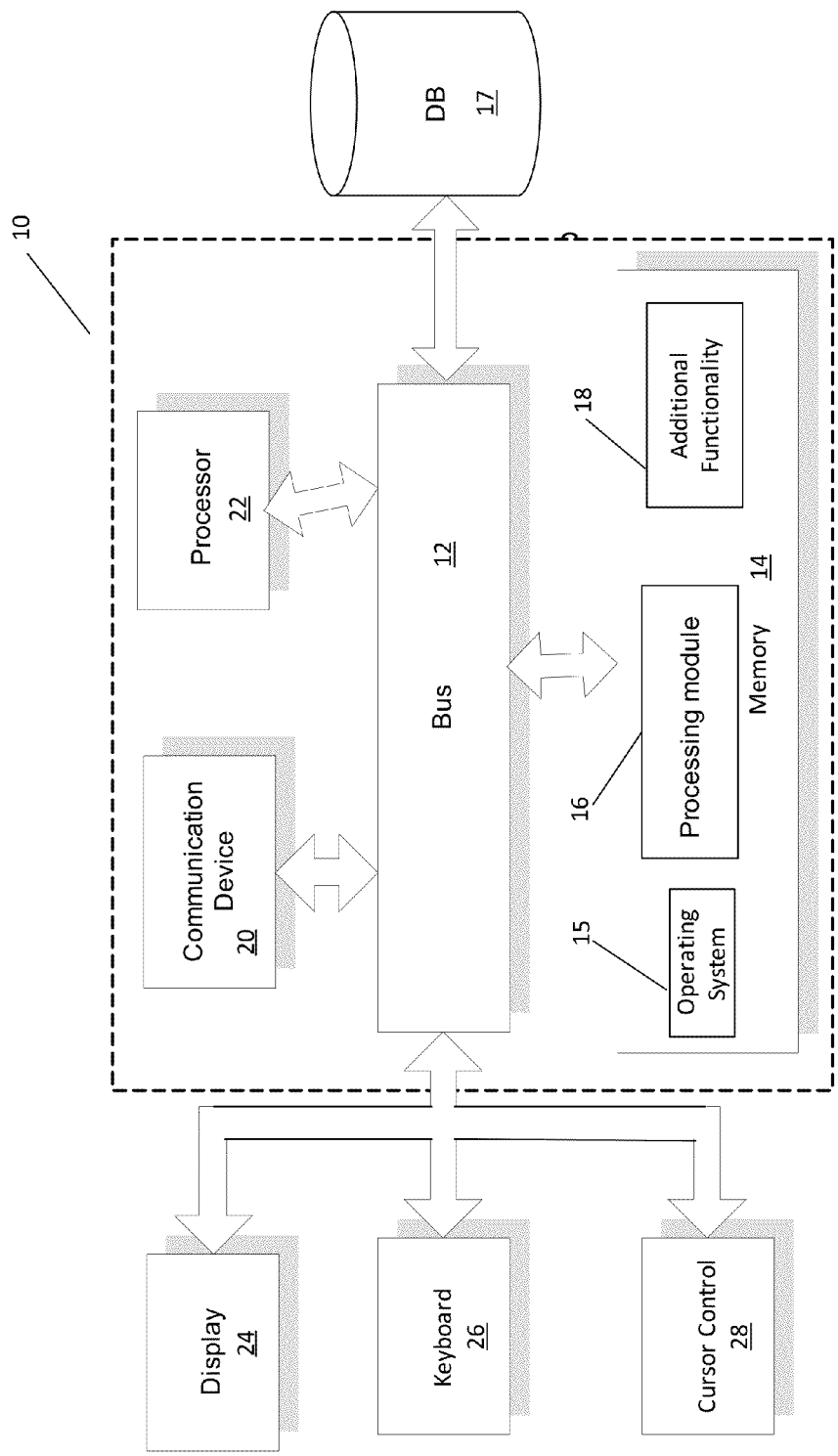
FIG. 11 is an overview block diagram of a computer system for visualizing network security alerts in accordance with one embodiment.

FIG. 11 is an overview block diagram of a computer system 10 for visualizing network security alerts in accordance with one embodiment. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. Processor 22 may be a processor that has a neural network computing architecture. System 10 further includes a memory 14 for storing information and instructions to be executed by processor 22. Memory 14 can include any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules may include an operating system 15 that provides operating system functionality for system 10. The modules may further include a processing module 16 that operates in conjunction with processor 22 to enable visualization of network security alerts, as disclosed in more detail below. System 10 can be part of a larger system. Therefore, system 10 will typically include one or more additional functional modules 18 to include the additional functionality, such as data processing functionality for receiving and processing parameters for visualizing alerts by processor 22. A database 17 is coupled to bus 12 to store data used with modules 16 and 18.

Figure 12:
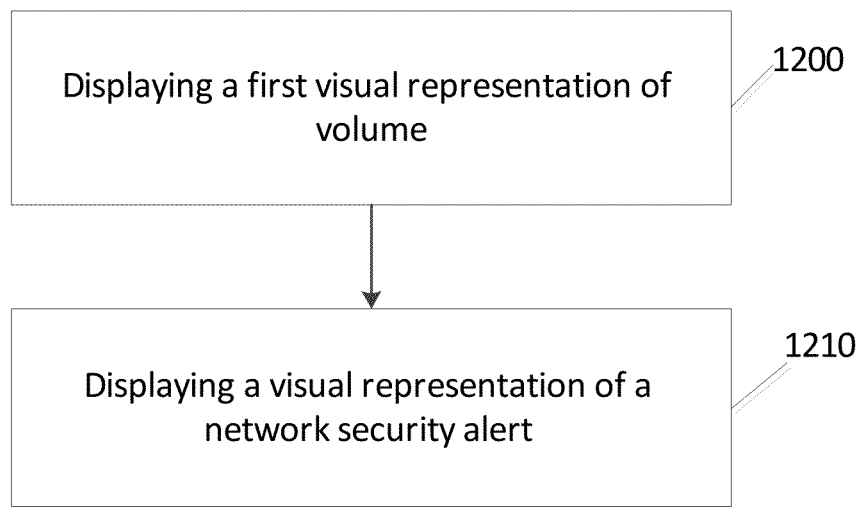
FIG. 12 illustrates a flow diagram of a method according to an embodiment.

FIG. 12 illustrates a flow diagram of a method according to an embodiment. In one embodiment, the functionality of the flow diagram of FIG. 12 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The method illustrated in FIG. 12 includes, at 1200, displaying, on a display, a first visual representation of volume in three-dimensional space. The method also includes, at 1210, displaying, on the display, a visual representation of a network security alert. The network security alert can correspond to a notification of a network attack, a network intrusion, or an unwanted activity. The representation of the network security alert can be positioned within the first visual representation of volume. The position of the representation of the network security alert within the first visual representation of volume can reflect at least one characteristic of the network security alert.

Figure 13:
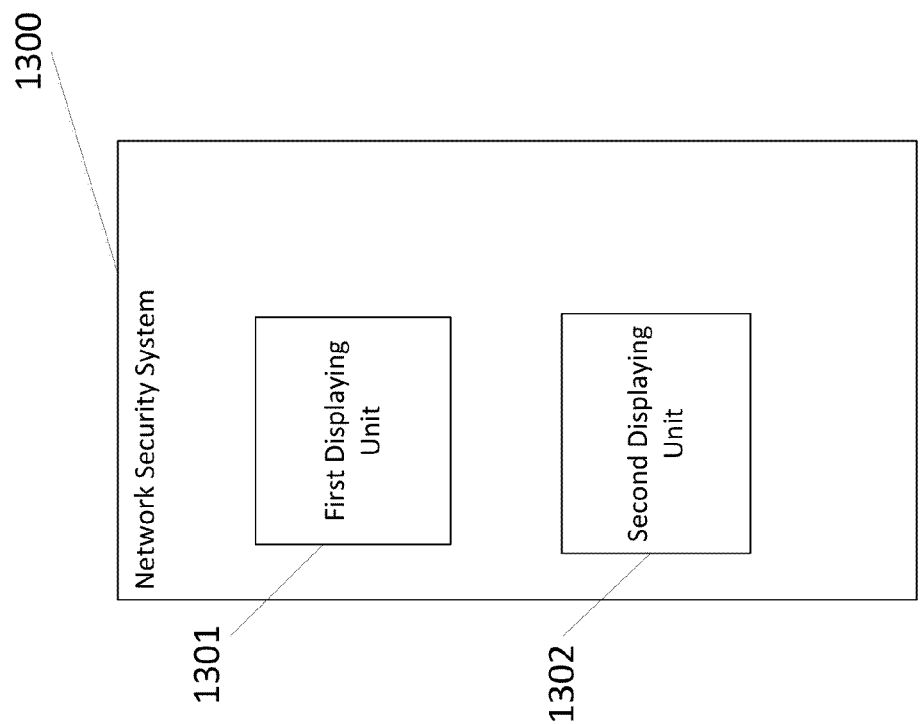
FIG. 13 illustrates an apparatus according to another embodiment.

FIG. 13 illustrates an apparatus according to another embodiment. In one embodiment, apparatus 1300 can be a network security system. Apparatus 1300 can include a first displaying unit 1301 that displays, on a display, a first visual representation of volume in three-dimensional space. Apparatus 1300 can also include a second displaying unit 1302 that displays, on the display, a visual representation of a network security alert. The network security alert can correspond to a notification of a network attack, a network intrusion, or an unwanted activity. The representation of the network security alert can be positioned within the first visual representation of volume. The position of the representation of the network security alert within the first visual representation of volume can reflect at least one characteristic of the network security alert.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    displaying, on a display, a first visual representation of volume in three-dimensional space; and
    displaying, on the display, a visual representation of a network security alert, wherein the network security alert corresponds to a notification of a network attack, a network intrusion, or an unwanted activity, the representation of the network security alert is positioned within the first visual representation of volume, and the position of the representation of the network security alert within the first visual representation of volume reflects at least one characteristic of the network security alert.

2. The method according to claim 1, further comprising displaying, on the display, a second visual representation of volume in three-dimensional space, wherein the first visual representation of volume is positioned within the second visual representation of volume, and the first visual representation of volume is positioned within the second visual representation of volume in accordance with a first logical coordinate system.

3. The method according to claim 2, further comprising displaying, on the display, a third visual representation of volume in three-dimensional space, wherein the second visual representation of volume is positioned within the third visual representation of volume, and the second visual representation of volume is positioned within the third visual representation of volume in accordance with a second logical coordinate system.

4. The method according to claim 1, wherein the representation of the network security alert is positioned within the first visual representation of volume according to at least one of a source internet address, a source port, a destination internet address, a destination port, a protocol, an alert identification number, and a common field corresponding to the network security alert.

5. The method according to claim 2, wherein the second representation of volume corresponds to a category such as one of a peer-to-peer category, a Trojan category, a chat client category, and a structured-query-language injection category.

6. The method according to claim 3, wherein the first visual representation of volume corresponds to a representation of a solar system, the second visual representation of volume corresponds to a representation of a galaxy, and the third visual representation of volume corresponds to a representation of a universe.

7. An apparatus, comprising:
    at least one processor; and
    at least one memory including computer program code,
    the at least one memory and the computer program code configured, with the at least one processor, to cause the apparatus at least to
    display, on a display, a first visual representation of volume in three-dimensional space; and
    display, on the display, a visual representation of a network security alert, wherein the network security alert corresponds to a notification of a network attack, a network intrusion, or an unwanted activity, the representation of the network security alert is positioned within the first visual representation of volume, and the position of the representation of the network security alert within the first visual representation of volume reflects at least one characteristic of the network security alert.

8. The apparatus according to claim 7, wherein the apparatus is also caused to display, on the display, a second visual representation of volume in three-dimensional space, the first visual representation of volume is positioned within the second visual representation of volume, and the first visual representation of volume is positioned within the second visual representation of volume in accordance with a first logical coordinate system.

9. The apparatus according to claim 8, wherein the apparatus is also caused to display, on the display, a third visual representation of volume in three-dimensional space, the second visual representation of volume is positioned within the third visual representation of volume, and the second visual representation of volume is positioned within the third visual representation of volume in accordance with a second logical coordinate system.

10. The apparatus according to claim 7, wherein the representation of the network security alert is positioned within the first visual representation of volume according to at least one of a source internet address, a source port, a destination internet address, a destination port, a protocol, an alert identification number, and a common field corresponding to the network security alert.

11. The apparatus according to claim 8, wherein the second representation of volume corresponds to a category such as one of a peer-to-peer category, a Trojan category, a chat client category, and a structured-query-language injection category.

12. The apparatus according to claim 9, wherein the first visual representation of volume corresponds to a representation of a solar system, the second visual representation of volume corresponds to a representation of a galaxy, and the third visual representation of volume corresponds to a representation of a universe.

13. A computer program, embodied on a non-transitory computer readable medium, the computer program configured to control a processor to perform a process, comprising:

displaying, on a display, a first visual representation of volume in three-dimensional space; and displaying, on the display, a visual representation of a network security alert, wherein the network security alert corresponds to a notification of a network attack, a network intrusion, or an unwanted activity, the representation of the network security alert is positioned within the first visual representation of volume, and the position of the representation of the network security alert within the first visual representation of volume reflects at least one characteristic of the network security alert.

14. The computer program of claim 13, wherein the process further comprises displaying, on the display, a second visual representation of volume in three-dimensional space, the first visual representation of volume is positioned within the second visual representation of volume, and the first visual representation of volume is positioned within the second visual representation of volume in accordance with a first logical coordinate system.

15. The computer program of claim 14, wherein the process further comprises displaying, on the display, a third visual representation of volume in three-dimensional space, the second visual representation of volume is positioned within the third visual representation of volume, and the second visual representation of volume is positioned within the third visual representation of volume in accordance with a second logical coordinate system.

16. The computer program according to claim 13, wherein the representation of the network security alert is positioned within the first visual representation of volume according to at least one of a source internet address, a source port, a destination internet address, a destination port, a protocol, an alert identification number, and a common field corresponding to the network security alert.

17. The computer program according to claim 14, wherein the second representation of volume corresponds to a category such as one of a peer-to-peer category, a Trojan category, a chat client category, and a structured-query-language injection category.

18. The computer program according to claim 15, wherein the first visual representation of volume corresponds to a representation of a solar system, the second visual representation of volume corresponds to a representation of a galaxy, and the third visual representation of volume corresponds to a representation of a universe.

\* \* \* \* \*